United States Patent
Sakai

(10) Patent No.: US 9,325,191 B2
(45) Date of Patent: Apr. 26, 2016

(54) CHARGER IN WHICH POWER CONSUMPTION IS REDUCED

(75) Inventor: Mamoru Sakai, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 172 days.

(21) Appl. No.: 13/992,265

(22) PCT Filed: Nov. 2, 2011

(86) PCT No.: PCT/JP2011/075260
§ 371 (c)(1),
(2), (4) Date: Jun. 14, 2013

(87) PCT Pub. No.: WO2012/081326
PCT Pub. Date: Jun. 21, 2012

(65) Prior Publication Data
US 2013/0265002 A1    Oct. 10, 2013

(30) Foreign Application Priority Data

Dec. 14, 2010  (JP) ................................. 2010-278111

(51) Int. Cl.
*H02J 7/00*  (2006.01)
*H02J 7/02*  (2006.01)
(Continued)

(52) U.S. Cl.
CPC ................. *H02J 7/007* (2013.01); *H02J 7/022* (2013.01); *H02J 7/045* (2013.01); *H02J 9/005* (2013.01); *H01M 10/46* (2013.01); *H01M 2220/30* (2013.01); *H02M 2001/0035* (2013.01); *Y02B 70/16* (2013.01)

(58) Field of Classification Search
CPC .......... H02J 7/007; H02J 7/045; H02J 9/005; H02J 7/022; Y02B 70/16; H01M 10/46; H01M 2220/30; H02M 2001/0035

USPC .......................................... 320/107, 141, 145
See application file for complete search history.

(56) References Cited

U.S. PATENT DOCUMENTS

2005/0258800 A1* 11/2005 Aradachi et al. .............. 320/107
2006/0119321 A1*  6/2006 Wang et al. ................... 320/145
(Continued)

FOREIGN PATENT DOCUMENTS

EP          1 043 824 A2    10/2000
EP          2 228 884 A2     9/2010
(Continued)

OTHER PUBLICATIONS

Office Action issued in Japanese Patent Application No. 2010-278111 mailed Jul. 29, 2014 (with translation).
International Search Report issued in International Application No. PCT/JP2011/075260 dated Jan. 31, 2012.
Jan. 21, 2016 Search Report issued in European Patent Application No. 11849859.1.

*Primary Examiner* — Richard Isla Rodas
*Assistant Examiner* — Nathaniel Pelton
(74) *Attorney, Agent, or Firm* — Oliff PLC

(57) ABSTRACT

A constant voltage power source circuit according to the present invention is configured to adjust electric power that is supplied to a microcomputer by a pulse width modulation control. The microcomputer is configured to output, to the constant voltage power source circuit, a continuous signal by which the constant voltage power source circuit continuously performs the pulse width modulation control, or an intermittent signal by which the constant voltage power source circuit intermittently performs the pulse width modulation control.

4 Claims, 4 Drawing Sheets

(51) Int. Cl.
  *H02J 9/00* (2006.01)
  *H02J 7/04* (2006.01)
  *H02M 1/00* (2007.01)
  *H01M 10/46* (2006.01)

(56) References Cited

U.S. PATENT DOCUMENTS

2009/0229898 A1* 9/2009 Fujino .................. B60L 7/24
   180/65.29

2010/0090647 A1  4/2010  Umetsu et al.

FOREIGN PATENT DOCUMENTS

| JP | A-2003-037974 | 2/2003 |
| JP | A-2004-120826 | 4/2004 |
| JP | A-2005-237146 | 9/2005 |
| JP | A-2005-333708 | 12/2005 |
| JP | A-2010-268623 | 11/2010 |

* cited by examiner

CHARGER IN WHICH POWER CONSUMPTION IS REDUCED

BACKGROUND OF THE INVENTION

1. Field of the Invention

The present invention relates to a charger that includes a power source control circuit that controls charging of a battery that supplies electric power to an electric power tool, a microcomputer that operates the power source control circuit, and a constant voltage power source circuit that supplies electric power to the microcomputer.

2. Description of the Related Art

A charger related to the above is disclosed in Japanese Laid-Open Patent Publication No. 2005-333708.

The charger disclosed in Japanese Laid-Open Patent Publication No. 2005-333708 includes a charging power source circuit for charging a battery, a power source control circuit that controls charging, and a constant voltage power source circuit that supplies electric power to the power source control circuit. The constant voltage power source circuit is configured such that an output voltage of the constant voltage power source circuit when the charger is disconnected from the battery is lower than that when charging of the battery (normal state) is performed.

The above construction can reduce unnecessary consumption of electric power when the charger is in a standby state.

SUMMARY OF THE INVENTION

Problems to be Solved by the Invention

The above-described charger is configured such that the output voltage of the constant voltage power source circuit can be lowered when the charger is disconnected from the charger. Because of this, when the charger is connected to the battery, the output voltage of the constant voltage power source circuit remains high as usual even if the charging of the battery is completed. As a result, unnecessary power consumption is consumed in the electric power control circuit during the period from a time when the charging of the battery is completed to a time when the battery is disconnected from the charger.

There is a need to reduce electric power consumption of the charger as much as possible during the period when the charging is not performed.

Summary of the Invention

Once construction can include a power source control circuit that controls charging of a battery that supplies electric power to an electric power tool, a microcomputer that operates the power source control circuit, and a constant voltage power source circuit that supplies electric power to the microcomputer. Further, the constant voltage power source circuit is configured to control electric power supplied to the microcomputer by a pulse width modulation control such that the voltage applied to the microcomputer becomes a predetermined voltage. Further, the microcomputer is configured to output, to the constant voltage power source circuit, a continuous signal by which the constant voltage power source circuit continuously performs the pulse width modulation control, or an intermittent signal by which the constant voltage power source circuit intermittently performs the pulse width modulation control.

According to another construction, the microcomputer is configured to output the continuous signal by which the constant voltage power source circuit continuously performs the pulse width modulation control, or the intermittent signal by which the constant voltage power source voltage intermittently performs the pulse width modulation control. Because of this, for example, even when the battery is connected to the charger after the charging is completed, the microcomputer outputs the intermittent signal to the constant voltage power source circuit and the pulse width modulation control is performed intermittently. Accordingly, power consumption of the charger can be reduced.

According to another construction, the microcomputer is configured to detect a connection or disconnection of the battery with respect to the charger, and also configured to output the intermittent signal to the constant voltage power source circuit, at lease when the disconnection of the battery with respect to the charger is detected.

Because of this, for example, even when the battery is removed from the charger during charging, the pulse width modulation control is performed intermittently in the constant voltage power source circuit. Thus, power consumption of the charger can be reduced.

According to another construction, the power source control circuit is configured to control charging when the power source control circuit receives a charging permission signal from the microcomputer. Further, the microcomputer is configured to output the continuous signal to the constant voltage power source circuit when the microcomputer outputs the charging permission signal to the power source control circuit, and also configured to output the intermittent signal to the constant voltage power source circuit when the microcomputer stops outputting the charging permission signal to the power source control circuit.

Because of this, when charging of the battery is performed, the continuous signal is output to the constant voltage power source circuit and the pulse width modulation control is continuously performed. Thus, the voltage of the constant voltage power source circuit is held at a predetermined voltage. Further, when charging is not performed, the intermittent signal is output to the constant voltage power source circuit and the pulse width modulation control is intermittently performed. Thus, power consumption of the charger can be reduced.

According to another construction, the microcomputer is configured to output the continuous signal to the constant voltage power source circuit even when the charging permission signal is not output, in case that the connection of the battery with respect to the charger is detected and that electric devices provided in the charger operate.

Because of this, when the electric devices operate, the pulse width modulation control is performed continuously and the voltage of the constant voltage power source circuit is held at a predetermined voltage. Thus, the electric devices operate properly.

According to another construction, the microcomputer is configured to stop outputting the intermittent signal and instead output the continuous signal to the constant voltage power source circuit, when the voltage of the constant voltage power source circuit decreases to a predetermined voltage.

Because of this, when the voltage of the constant voltage power source circuit decreases to the predetermined voltage, the pulse width modulation control is continuously performed in the constant voltage power source circuit and the voltage of the constant voltage power source circuit increases to the predetermined voltage. Accordingly, the voltage of the constant voltage power source circuit does not decreases to the predetermined voltage, and thus the operation of the microcomputer etc. do not become unstable.

According to the above, electric power consumption of the charger can be reduced as much as possible during the period when the charging is not performed.

DETAILED DESCRIPTION OF THE INVENTION

[Embodiment 1]

Hereinafter, a charger according to an embodiment 1 will be described with reference to FIG. 1 to FIG. 4.

<Outline of Charger 10>

Figure 1:
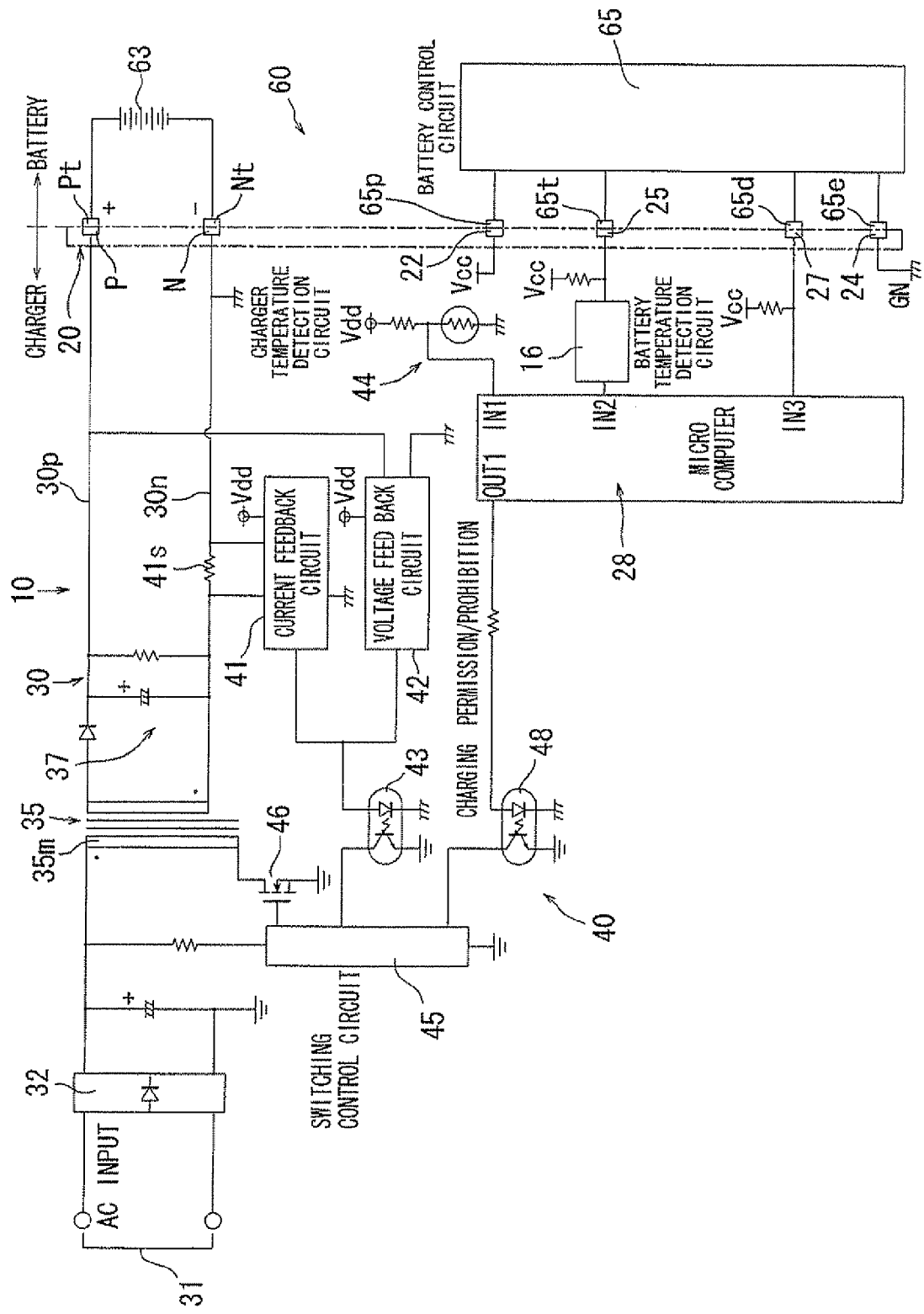
FIG. 1 is an electric circuit diagram showing a microcomputer, a charging power source circuit, a power source control circuit, and an electric power tool battery etc. of a charger according to an embodiment 1 of the present invention.
Figure 2:
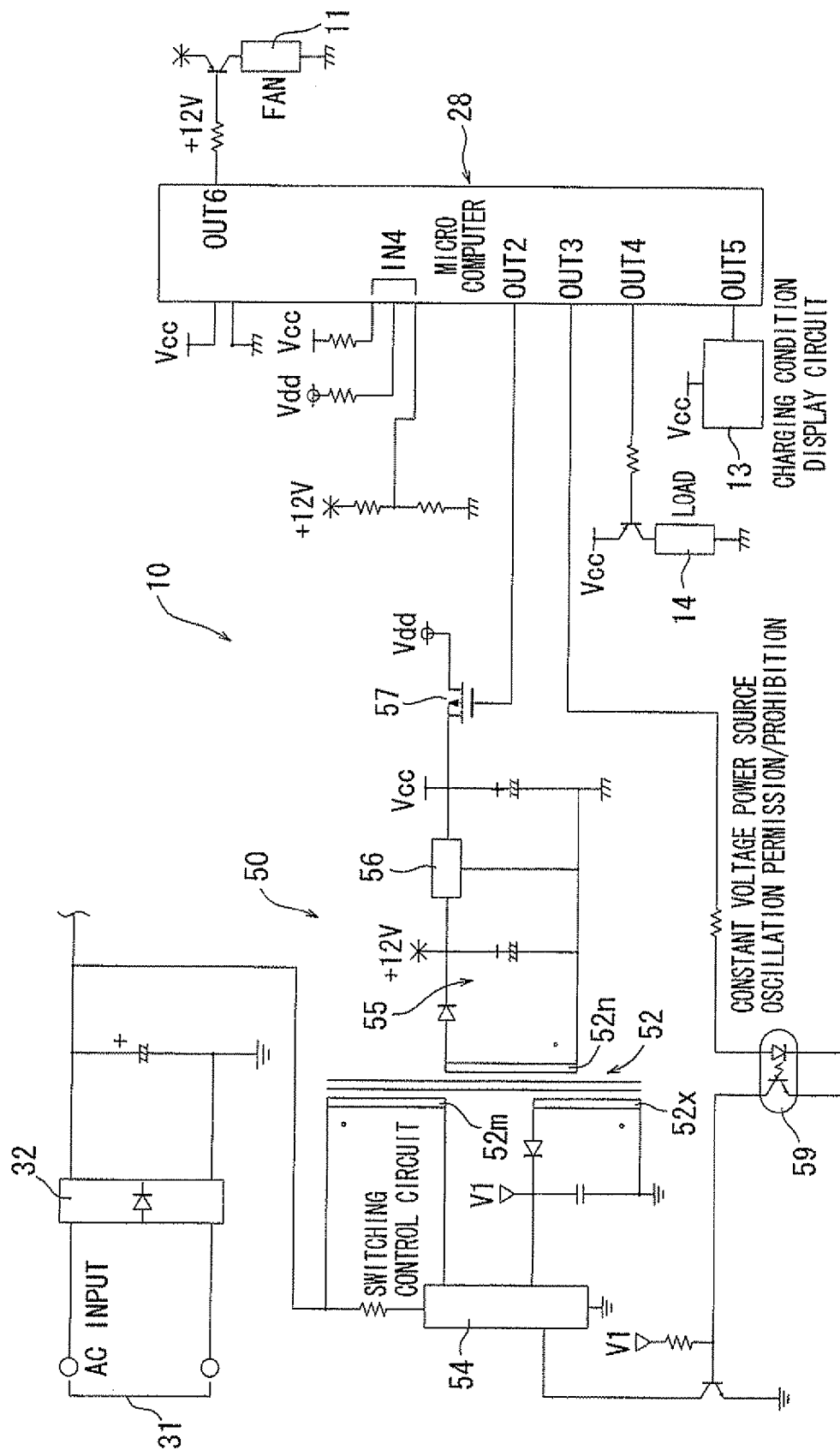
FIG. 2 is an electric circuit diagram showing the microcomputer and a constant voltage power source circuit etc. of the charger according to the embodiment 1 of the present invention.

The charger 10 is a device for performing charging of an electric power tool battery 60. As shown in FIG. 1 and FIG. 2, the charger 10 includes a charging power source circuit 30, a power source control circuit 40, a microcomputer 28, and a constant voltage power source circuit 50.

The charging power source circuit 30 includes a power source circuit for performing charging of a cell 63 of the electric power tool battery 60. The power source control circuit 40 is for controlling charging based on signals from the microcomputer 28, and includes a feedback circuit of charge voltage and charge current and a circuit for detecting temperature or the like in the charger. The constant voltage power source circuit 50 is for supplying electric power to the power source control circuit 40, the microcomputer 28, a battery control circuit 65 of the electric power tool battery 60, etc.

The microcomputer 28 is configured to drive the power source control circuit 40 based on signals that are transmitted from the battery control circuit 65 of the electric power tool battery 60, and also configured to control the constant voltage power source circuit 50. Further, the microcomputer 28 is configured to monitor a charging condition, raise an alarm, etc.

The charging power source circuit 30, the power source control circuit 40, the microcomputer 28, and the constant voltage power source circuit 50 of the charger 10 are accommodated in a housing (not shown), and a connection portion 20 to which the electric power tool battery 60 is connected is provided on an upper surface of the housing.

As shown in FIG. 1, charging terminals P and N of the charging power source circuit 30 are provided in the connection portion 20, and terminals Pt (+) and Nt (−) of the cell 63 of the electric power tool battery 60 are connected to the charging terminals P and N when the electric power tool battery 60 is connected to the charger 10. In addition, a power source terminal 22 and a ground terminal 24 are provided in the connection portion 20, and a power source terminal 65p and a ground terminal 65e of the battery control circuit 65 of the electric power tool battery 60 are connected to the power source terminal 22 and the ground terminal 24, respectively. Further, an analog terminal 25 and a digital terminal 27 are provided in the connection portion 20, and a battery temperature signal terminal 65t and a communication terminal 65d of the battery control circuit 65 are connected to the analog terminal 25 and the digital terminal 27, respectively.

<Charging Power Source Circuit 30>

As shown in FIG. 1, the charging power source circuit 30 includes a rectifier 32 that converts alternating current power, which is supplied from an outlet (not shown) through a plug 31, to direct current power, a transformer 35 that steps down voltage after rectification, a smoothing circuit 37 that is provided on a secondary side of the transformer 35, and charging lines 30p and 30n. Further, the charging lines 30p and 30n are connected to charging terminals P and N of the connection portion 20, respectively.

Because of this, the electric power tool battery 60 is connected to the charger 10 and the direct current power is smoothened by the smoothing circuit 37, and then the smoothened direct current power can be supplied to the cell 63 of the electric power tool battery 60 through the charging lines 30p and 30n, charging terminals P and N, and the terminals Pt and Nt.

Here, as shown in FIG. 2, the plug 31 and the rectifier 32 are also used in the constant voltage power source circuit 50 as described below.

<Power Source Control Circuit 40>

The power source control circuit 40 controls charging operation of the charging power source circuit 30 to the electric power tool battery 60 based on a charging permission signal (described below) from the microcomputer 28, and is configured to operate the charging power source circuit 30 in a stable manner. The power source control circuit 40 includes a current feedback circuit 41, a voltage feedback circuit 42, a photo-coupler for feedback 43, and a switching control circuit 45. Further, the power source control circuit 40 includes a charger temperature detection circuit 44 that detects the temperature in the charger 10 or the temperature of the element in the charger 10.

The current feedback circuit 41 amplifies the charge current signals, which are converted to voltage by a shunt resistor 41s, to a predetermined voltage level, and transmits the amplified signals to the switching control circuit 45. The voltage feedback circuit 42 steps down the charge voltage signals to a predetermined voltage level and transmits the stepped-down signals to the switching control circuit 45.

A photo-coupler for feedback 43 is configured to transmit the charge current signals and the charge voltage signals to the switching control circuit 45, while an electrical insulation between the current feedback circuit 41, the voltage feedback circuit 42, and the switching control circuit 45 is secured.

The switching control circuit 45 drives an electric power supplying FET 46, and the switching control circuit adjusts, by a PWM control (pulse width modulation control), electric power that is supplied to a primary winding 35m of the transformer 35 of the charging power source circuit 30 such that charge current values and charge voltage values approach set values. The switching control circuit 45 is configured to drive when the charging permission signal is input from the microcomputer 28 through a first photo-coupler 48. Further, the switching control circuit 45 is configured to stop when the charging permission signal is not input from the microcomputer 28.

<Constant Voltage Power Source Circuit 50>

As shown in FIG. 2, the constant voltage power source circuit 50 includes a Vcc power source part (DC5V) that supplies electric power to the microcomputer 28, etc., a Vdd power source part (DC5V) that supplies electric power to the power source control circuit 40, etc., and a 12V power source part that supplies electric power to the cooling fan 11. The constant voltage power source circuit 50 includes a transformer 52, a switching control circuit 54, a smoothing circuit 55, a regulator 56, and a switching FET 57.

The transformer 52 includes a primary side winding 52*m*, a secondary side winding 52*n*, and a winding 52*x* for feedback, and is configured such that output voltage of the rectifier 32 of the charging power source circuit 30 is applied to the primary side winding 52*m*. The smoothing circuit 55 is connected to the secondary side of the transformer 52, that is, the secondary side winding 52*n*, and the output side of the smoothing circuit 55 is the 12V power source part.

In addition, the regulator 56, which steps down 12V voltage to 5V and maintains a constant voltage, is provided in the output side of the smoothing circuit 55. Further, the Vcc power source part (DC5V) is provided in the output side of the regulator 56. In addition, the Vdd power source part (DC5V) is connected to the Vcc power source part (DC5V) through the switching FET 57.

The switching FET 57 turned on and off based on a signal from the microcomputer 28. When the switching FET 57 is turned on, the Vcc power source part and the Vdd power source part are electrically connected to each other. That is, when the switching FET 57 is turned on, electric power is supplied from the Vcc power source part to the Vdd power source part. In addition, when the switching FET 57 is turned off, the Vdd power source part is disconnected from the Vcc power source part, and the voltage of the Vdd power source part becomes 0 volts.

The winding 52*x* for feedback of the transformer 52 detects voltage that is generated in the secondary side winding 52*n*, and inputs the voltage signals V1 (12V) to switching control circuit 54. A winding number of the winding 52*x* for feedback is set based on a winding ratio between the primary side winding 52*m* and the secondary side winding 52*n*.

The switching control circuit 54 is configured to operate based on an intermittent signal (intermittent oscillation is turned on) or a continuous signal (intermittent oscillation is turned off) from the microcomputer 28 that is input through a second photo-coupler 59. That is, when the continuous signal (intermittent oscillation is turned off) is input, the switching control circuit 54 drives an inner FET (not shown), and the switching control circuit adjusts electric power, which is supplied to the primary winding 52*m* of the transformer 52, by a PWM control (pulse width modulation control) such that the voltage of the secondary side winding 52*n* becomes 12V. Further, when the intermittent signal (intermittent oscillation is turned on) is input, the switching control circuit 54 intermittently performs a PWM control (pulse width modulation control).

As shown in FIG. 2, the cooling fan 11 is connected to the 12V power source part of the constant voltage power source circuit 50. Further, the cooling fan 11 is driven based on an output signal from the microcomputer 28. The cooling fan 11 is used for cooling the electric power tool battery 60 and the charger 10.

The microcomputer 28, a charging condition display circuit 13 that displays a charging condition, a load of the warning circuit 14, and a battery temperature detection circuit 16 (refer to FIG. 1) are connected to the Vcc power source part (DC5V) of the constant voltage power source circuit 50. In addition, as shown in FIG. 1, when the electric power tool battery 60 is connected to the charger 10, the battery control circuit 65 of the electric power tool battery 60 is connected to the Vcc power source part (DC5V).

Further, as shown in FIG. 1, the current feedback circuit 41, the voltage feedback circuit 42, and the charger temperature detection circuit 44 of the power source control circuit 40 are connected to the Vdd power source part (DC5V) of the constant voltage power source circuit 50.

<Microcomputer 28>

The microcomputer 28 is configured to drive the power source control circuit 40 based on signals from the battery control circuit 65 of the electric power tool battery 60, and also is configured to control the constant voltage power source circuit 50. In addition, the microcomputer 28 is configured to monitor a charging condition and raise an alarm, and also is configured to detect a connected and unconnected state between the charger 10 and the electric power tool battery 60.

That is, when the charger 10 and the electric power tool battery 60 are connected to each other, as shown in FIG. 1, the Vcc power source part (DC5V) of the constant voltage power source circuit 50 is connected to the battery control circuit 65 of the electric power tool battery 60. Further, the battery temperature detection circuit 16 is connected to the battery control circuit 65 to be operated, and a battery temperature signal of the battery temperature detection circuit 16 is input to an input terminal IN2 of the microcomputer 28. In addition, battery data is input from the battery control circuit 65 to an input terminal IN3 of the microcomputer 28 through the digital terminal 27. The microcomputer 28 detects the connection between the charger 10 and the electric power tool battery 60 by an input of the battery temperature signals of the battery temperature detection circuit 16. Further, when the charger 10 is disconnected from the electric power tool battery 60 and the battery temperature signals that is input to the input terminal IN2 are abnormal values, the microcomputer 28 is to detect disconnection (disconnected state) between the charger 10 and the electric power tool battery 60.

As shown in FIG. 1, a charger temperature signal is input from the charger temperature detection circuit 44 of the power source control circuit 40 to an input terminal IN1 of the microcomputer 28. In addition, the microcomputer 28 is configured to output a charging permission signal from an output terminal OUT1 to the switching control circuit 45 (first photo-coupler 48) of the power source control circuit 40, or is configured to stop the output of the charging permission signal. The charging permission signal permits charging, and the signal is output when the battery data from the battery control circuit 65 and the battery temperature signals of the battery temperature detection circuit 16 are normal and also the charging of the electric power tool battery 60 is not completed.

As shown in FIG. 2, the voltage signal of the 12V power source part, the voltage signal of the Vcc power source part, and the voltage signal of the Vdd power source part of the constant voltage power source circuit 50 are input to an input terminal IN4 of the microcomputer 28. Thus, voltage of the constant voltage power source circuit 50 can be monitored by the microcomputer 28.

The microcomputer 28 is configured to output ON and OFF signals from an output terminal OUT2 to the switching FET 57 of the constant voltage power source circuit 50. The ON signal of the switching FET 57 is output when the charging permission signal is output and also the microcomputer 28 detects the connection between the charger 10 and the electric power tool battery 60. That is, the switching FET 57 of the constant voltage power source circuit 50 is turned on while the charging of the electric power tool battery 60 is performed.

The microcomputer 28 is configured to output an intermittent signal (intermittent oscillation is turned on) or a continuous signal (intermittent oscillation is turned off) from an output terminal OUT3 to the switching control circuit 54

(second photo-coupler 59) of the constant voltage power source circuit 50. As described above, the continuous signal is for continuously performing a PWM control with respect to the switching control circuit 54. For this, when the continuous signal is input, the switching control circuit 54 continuously adjusts the electric power, which is supplied to the primary side winding 52m, by a PWM control such that the voltage of the second side winding 52n of the transformer 52 becomes 12V. The intermittent signal is for intermittently performing a PWM control with respect to the switching control circuit 54 and is configured to be turned on when the continuous signal are turned off. Since the switching control circuit 54 intermittently performs a PWM control when the intermittent signal is input, the electric power that is supplied to the primary side winding 52m becomes intermittently 0 volts.

In general, the microcomputer 28 is configured to output the continuous signal at the time of charging the electric power tool battery 60, and is configured to output the intermittent signal except for the time of the charging. However, even except for the time of the charging, the microcomputer 28 is configured to output the continuous signal (intermittent oscillation is turned off) when the voltage signals of the 12V power source part or the Vcc power source part are less than or equal to a threshold voltage (predetermined voltage), or when the cooling fan 11 etc. are operated.

In addition, a load of the warning circuit 14 etc. are connected to an output terminal OUT4 of the microcomputer 28, and the charging condition display circuit 13 that displays a charging condition is connected to an output terminal OUT5. Further, the cooling fan 11 is connected to an output terminal OUT6 of the microcomputer 28.

<Operation of Charger 10>

Next, an operation of the charger 10 will be described with reference to a flowchart of FIG. 3 and a timing diagram of FIG. 4. Here, a procedure shown in the flowchart of FIG. 3 is performed based on a program that is stored in a memory of the microcomputer 28.

Figure 4:
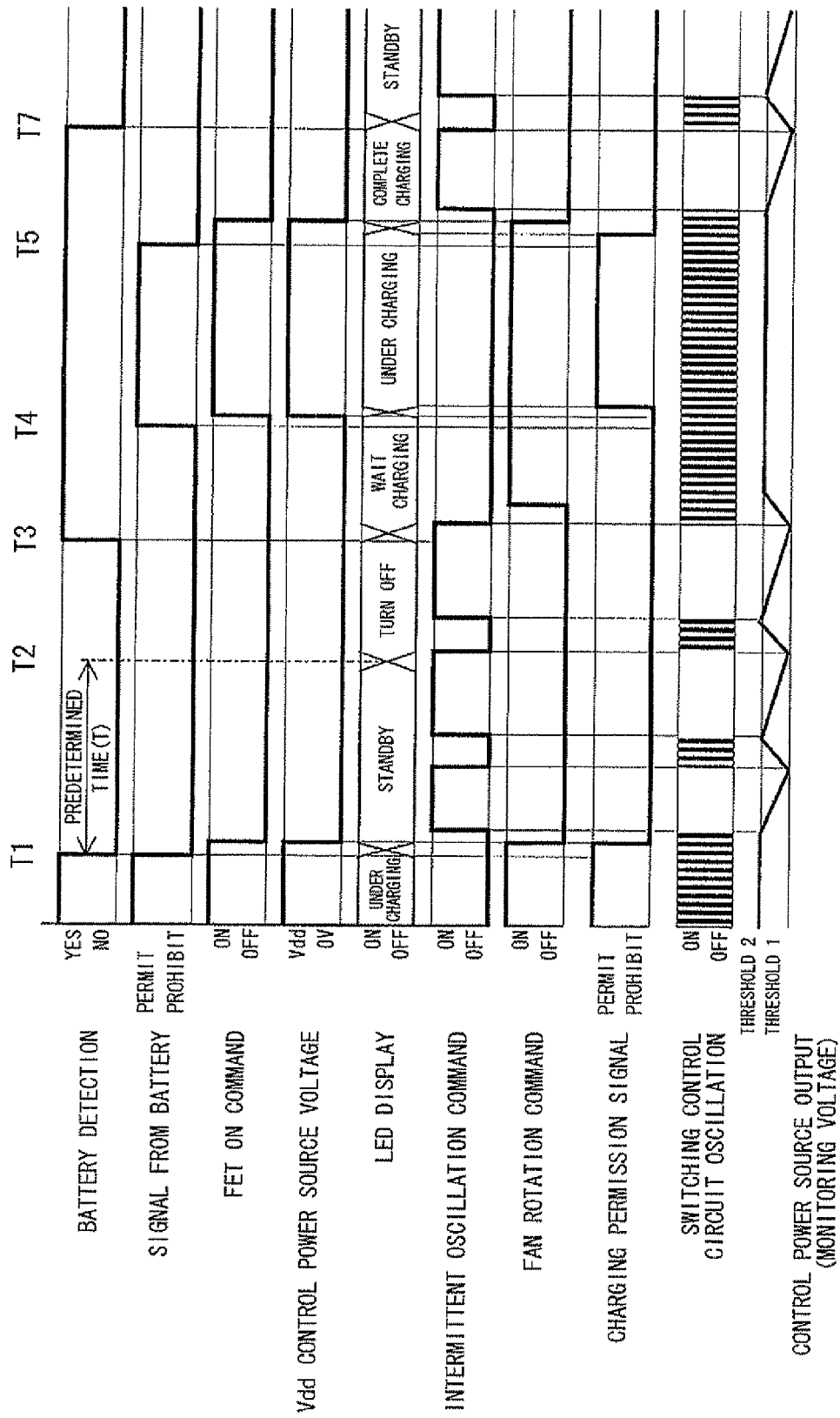
FIG. 4 is a timing diagram of the charger.

First, descriptions are performed from a standby state in which the charger 10 is disconnected from the electric power tool battery 60, that is, a state between T1 and T2 in the timing diagram of FIG. 4. In the standby state, the plug 31 of the charging power source circuit 30 is to be connected to the outlet.

Figure 3:
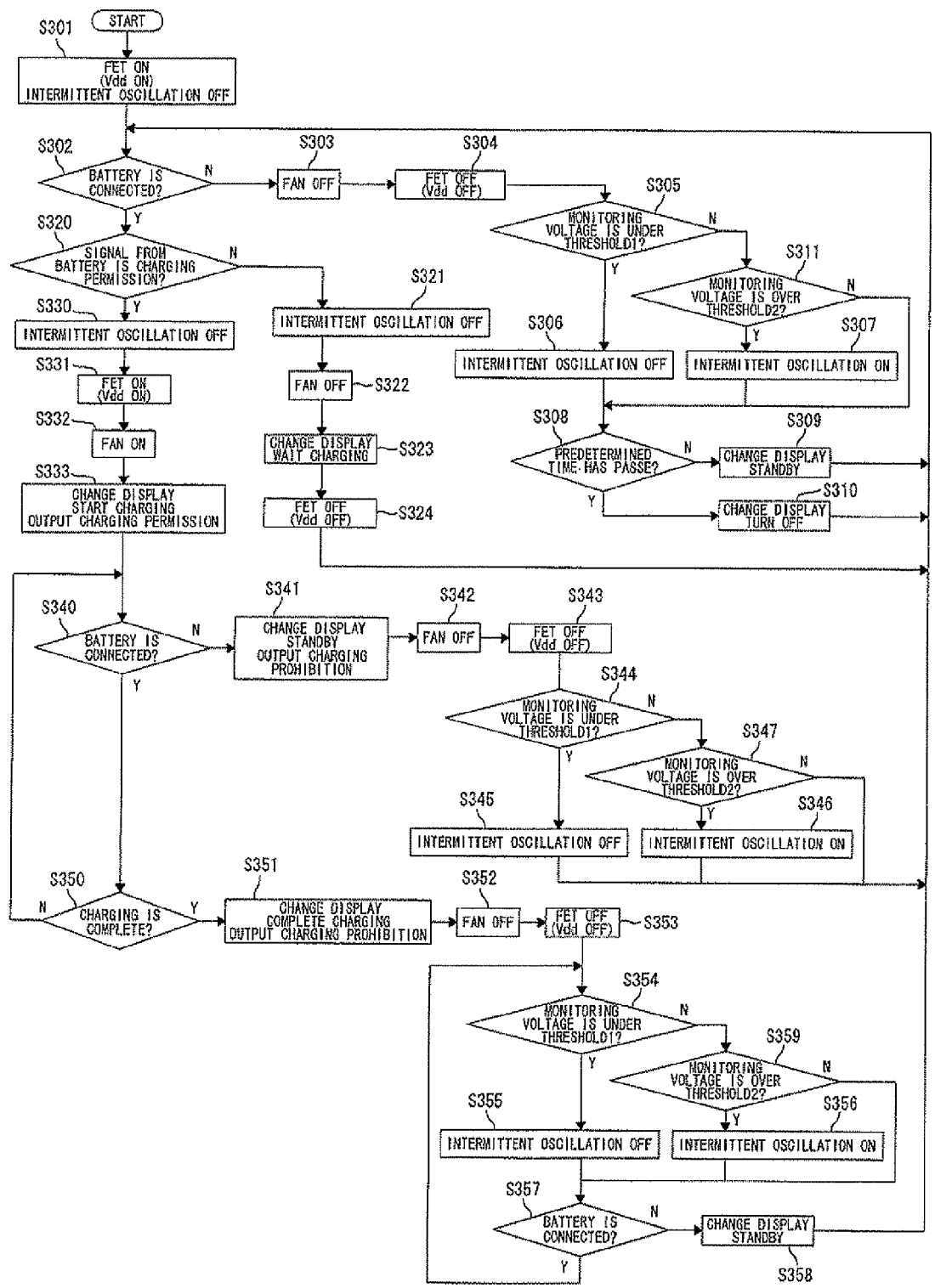
FIG. 3 is a flowchart of a switching FET operation and a switching control circuit operation of the constant voltage power source circuit in the charger.

In this state, in the flowchart of FIG. 3, a judgment whether the battery is connected or not in step S302 is NO, and thus in step S303 the cooling fan 11 is turned off, and in step S304 the switching FET 57 of the constant voltage power source circuit 50 is turned off. Because of this, the Vdd power source part of the constant voltage power source circuit 50 is disconnected from the Vcc power source part, and the voltage of the Vdd power source part becomes 0 volts. As a result, the current feedback circuit 41, the voltage feedback circuit 42, and the charger temperature detection circuit 44 of the power source control circuit 40 do not operate.

When the input to the IN4 of the microcomputer 28 (monitoring voltage of the 12V power source part and the Vcc power source part) exceeds a threshold voltage (threshold 1) (NO in step S305) and is more than another threshold voltage (operation voltage (predetermined voltage)) (threshold 2) (YES in step 311), the intermittent signal (intermittent oscillation is turned on) is output to the switching control circuit 54 of the constant voltage power source circuit 50 in step S307. Then, the switching control circuit 54 intermittently performs a PWM control. That is, in step S305 and step S311, voltage monitoring of the 12V power source part and the Vcc power source part is performed, and when the monitoring voltage is more than an operation voltage (threshold 2) (YES in step S311), the PWM control is stopped. And then, the monitoring voltage is gradually decreased (refer to FIG. 4). Further, when the monitoring voltage is decreased to a predetermined voltage (threshold 1) (YES in step S305), the continuous signal (intermittent oscillation is turned off) is output (step S306), and the PWM control is performed.

Further, between the timings T1 and T2, since a judgment whether a predetermined time has passed or not is NO in step S308, a LED of the charging condition display circuit 13 that displays a standby condition is turned on in step S309.

Next, as shown in the timing diagram of FIG. 4, when the monitoring voltage increases to the operation voltage (predetermined voltages 12V and 5V (threshold 2)) by performing a PWM control, the PWM control is stopped (steps S311 and S307 in FIG. 3).

That is, when the intermittent signal is input, the switching control circuit 54 stops the PWM control while the monitoring voltage decreases from the operation (predetermined) voltage (threshold 2) to the predetermined voltage (threshold 1). And while the monitoring voltage increases from the predetermined voltage (threshold 1) to the operation (predetermined) voltage (threshold 2), the switching control circuit performs the PWM control. By repeating this, electric power consumption of the constant voltage power source circuit 50 can be reduced.

The predetermined voltage (threshold 1) is set to the minimum voltage that is required to drive the microcomputer 28.

In this way, when a predetermined time has passed while the standby state is held (timing T2 in FIG. 4), a judgment whether the predetermined time has passed or not is YES in step S308 in the flowchart of FIG. 3, and the LED for indicating the standby state of the charging condition display circuit 13 is turned off in step S310 (refer to the timing diagram of FIG. 4). This way, the consumption of the electric power of the charging condition display circuit 13 is reduced.

Next, when the electric power tool battery 60 is connected to the charger 10 (timing T3 in FIG. 4), the judgment whether the battery is connected or not is YES in step S302 of FIG. 3, and then a further judgment is made whether the battery control circuit 65 outputs the charging permission signal to the microcomputer 28 or not in step S320. Further, when the charging permission signal is not output (NO in step S320), the continuous signal is output (intermittent oscillation is turned off) (step S321), the cooling fan 11 is turned on (step S322), and an LED for indicating a charge standby state of the charging condition display circuit 13 is turned on (step S323). In addition, the switching FET 57 is maintained in an OFF state (step 324 in FIG. 3).

The aim of turning off the intermittent oscillation in step S321 is to control the voltage of the 12V power source part and the Vcc power source part of the constant voltage power source circuit 50 such that they become a constant value (12V and 5V), and also to obtain a sufficient voltage for driving the cooling fan 11.

Next, when the battery control circuit 65 outputs the charging permission signal to the microcomputer 28 (timing T4 in FIG. 4), a judgment whether the signal from the battery is the charging permission signal or not is YES in step S320 in the flowchart of FIG. 3, and the continuous signal is output in step S330 (intermittent oscillation is turned off). In addition, in step S331, the switching FET 57 of the constant voltage power source circuit 50 is turned on. Because of this, the Vcc power source part and the Vdd power source part of the constant voltage power source circuit 50 are connected to each other, and electric power is supplied from the Vcc power source part to the Vdd power source part. As a result, the current feedback circuit 41, the voltage feedback circuit 42, and the charger temperature detection circuit 44 of the power source control circuit 40 are operated (risen). Further, the cooling fan 11 is turned on (step S332), and the LED of the charging condition display circuit 13 is turned on in step S333. In addition, the charging permission signal is input to the switching control circuit 45 of the power source control circuit 40, and thus, the switching control circuit 45 is operated. Because of this, charging the cell 63 of the electric power tool battery 60 is performed.

Further, as described above, in step S330, the continuous signal is output (intermittent oscillation is turned off), and thus, the switching control circuit 54 continuously adjusts the electric power, which is supplied to the primary winding 52m of the transformer 52, by the PWM control (pulse width modulation control) such that the voltage of the secondary side winding 52n becomes 12V. Because of this, the voltages of the 12V power source part, the Vcc power source part, and the Vdd power source part of the constant voltage power source circuit 50 are maintained constant.

As a result, the cooling fan 11 and the power source control circuit 40 can be operated in a stable manner.

After that, when the charging is completed (timing T5 of FIG. 4), a judgment whether the charging is completed or not is YES in step S350 in the flowchart of FIG. 3, and the LED, which indicates a completion of the charging, of the charging condition display circuit 13 is turned on in step S351. Further, the output of the charging permission signal to the switching control circuit 45 of the power source control circuit 40 is stopped, and thus, the output of the switching control circuit 45 is stopped (step S351). In addition, the cooling fan 11 is turned off (step S352). Further, the switching FET 57 of the constant voltage power source circuit 50 is turned off (step S353), and thus, the voltage of the Vdd power source part becomes 0 volts. Consequently, the current feedback circuit 41, the voltage feedback circuit 42, and the charger temperature detection circuit 44 of the power source control circuit 40 are not operated.

Further, similar to the procedures shown in steps S305, S306, S307, and S311 as described above, the intermittent signal (intermittent oscillation is turned on) is output to the switching control circuit 54 of the constant voltage power source circuit 50 (steps S354, S355, S356, and S359).

Next, when the electric power tool battery 60 is disconnected from the charger 10 (timing T7 of FIG. 4), a judgment whether the battery is connected or not is NO in step S357 in the flowchart of FIG. 3, and the LED, which indicates a standby state, of the charging condition display circuit 13 is turned on in step S358.

If the electric power tool battery 60 is detached from the charger 10 during the charging, a judgment whether the battery is connected or not is NO in step S340 in the flowchart of FIG. 3. Then, the LED, which indicates a standby state, of the charging condition display circuit 13 is turned on in step S341, and a charging prohibition signal is output from the microcomputer 28 (step S341). And the switching FET 57 of the constant voltage power source circuit 50 is turned off (step S343). Because of this, the current feedback circuit 41, the voltage feedback circuit 42, and the charger temperature detection circuit 44 of the power source control circuit 40 are not operated.

<Advantage of Charger 10 According to the Present Embodiment>

According to the charger 10 of the present embodiment, the microcomputer 28 is configured to output the continuous signal or the intermittent signal such that the switching control circuit 54 of the constant voltage power source circuit 50 performs the pulse width modulation control continuously or intermittently. Because of this, for example, even when the charger 10 is connected to the electric power tool battery 60 after the charging has completed, the microcomputer 28 outputs the intermittent signal to the switching control circuit 54 of the constant voltage power source circuit 50 and thus the pulse width modulation control is performed intermittently. As a result, power consumption of the charger 10 can be reduced.

Further, for example, in case the electric power tool battery 60 is removed from the charger 10 while the charging is performed, the pulse width modulation control is performed intermittently in the switching control circuit 54 of the constant voltage power source circuit 50. As a result, power consumption of the charger 10 can be reduced.

Further, while the charging of the electric power tool 60 is performed, the continuous signal is output to the switching control circuit 54 of the constant voltage power source circuit 50. Thus, the pulse width modulation control is performed continuously, and the voltage of the constant voltage power source circuit 50 is held at a predetermined voltage.

In addition, while the cooling fan 11 (electric device) is operated, the pulse width modulation control is performed continuously in the switching control circuit 54 and the voltage of the constant voltage power source circuit 50 is held at a predetermined voltage. Because of this, the cooling fan 11 can be operated properly.

Further, the microcomputer 28 is configured such that when the voltage of the constant voltage power source circuit 50 decreases to a predetermined voltage, the microcomputer 28 stops outputting the intermittent signal to the switching control signal 54 of the constant voltage power source circuit 50 and instead outputs the continuous signal. Because of this, the pulse width modulation control is performed continuously in the switching control circuit 54, and the voltage of the constant voltage power source circuit 50 increases to a predetermined voltage. Accordingly, the voltage of the constant voltage power source circuit 50 does not decrease to the predetermined voltage, and the microcomputer 28 does not operate in an unstable manner.

<Modification>

The present invention is not restricted to the embodiment described above and may be modified without departing from the scope of the invention. In the present embodiment, as shown in the timing diagram of FIG. 4, the example is shown that when the intermittent signal is input, the switching control circuit 54 stops the pulse width modulation control during the period while the monitoring voltage of the constant voltage power source circuit 50 decreases from the operating (predetermined) voltage to the predetermine voltage, and performs the pulse width modulation control during the period while the monitoring voltage increases from the predetermined voltage to the operating (predetermined) voltage. However, it is possible that a stoppage period and an execution period of the pulse width modulation may be set in a timer when the intermittent signal is input, and the pulse width modulation control may be stopped and performed periodically. Further, it may be possible to adjust the stoppage period and the execution period of the pulse width modulation control.

Further, the example is shown that the cooling fan 11 does not operate after the charging has completed in step S352 of the flowchart in FIG. 3. However, it may be possible to continue to operate the cooling fan 11 depending on the temperature of the electric power tool battery 60. In this case, necessary voltage for operating the cooling fan 11 can be obtained by outputting the continuous signal (intermittent oscillation is off).

Further, as shown in the timing diagram of FIG. 4, the microcomputer 28 monitors and controls the power source output such that the intermittent signal is output (intermittent oscillation is on) when the monitoring voltage is above the operation (predetermined) voltage (threshold voltage 2) and the continuous signal is output (intermittent oscillation is off) when the monitoring voltage is below the predetermined voltage (threshold 1). However, it may be possible depending on a specification of the switching control circuit 54 that the microcomputer 28 outputs an intermittent oscillation permission signal to the switching control circuit 54 and then the switching control circuit 54 performs an on and off control of the intermittent oscillation while the switching control circuit 54 monitors the voltage V1 of FIG. 2 within the switching control circuit 54.

Further, in general, when a nickel hydride battery etc. is used, a trickle charge is performed for compensating an amount of self-charging. In this case, after charging is completed, by performing a procedure such that the intermittent oscillation is turned off=>the FET is turned on=>required amount is charged=>the intermittent oscillation is turned on, electric consumption can be reduced when the trickle charge is not performed, while the trickle charge is performed.

EXPLANATION OF SYMBOLS

10 . . . charger
11 . . . cooling fan (electric device)
13 . . . charging condition display circuit
14 . . . warning circuit
16 . . . battery temperature detection circuit
28 . . . microcomputer
30 . . . charging power source circuit
40 . . . power source control circuit
41 . . . current feedback circuit
42 . . . voltage feedback circuit
44 . . . charger temperature detection circuit
50 . . . constant voltage power source circuit
54 . . . switching control circuit
57 . . . switching FET (switch)
60 . . . electric power tool battery (battery)
65 . . . battery control circuit

What is claimed is:

1. A charger comprising:
a power source control circuit that controls charging of a battery that supplies electric power to an electric power tool;
a microcomputer that operates the power source control circuit; and
a constant voltage power source circuit that supplies electric power to the microcomputer and the power source control circuit, wherein:
the constant voltage power source circuit is configured to control electric power supplied to the microcomputer by a pulse width modulation control such that the voltage applied to the microcomputer becomes a predetermined voltage;
the microcomputer is configured to output in a time sequence, to the constant voltage power source circuit, a continuous signal by which the constant voltage power source circuit continuously performs the pulse width modulation control, and an intermittent signal by which the constant voltage power source circuit intermittently performs the pulse width modulation control such that the constant voltage power source circuit controls the voltage applied to the microcomputer between a minimum voltage that is required to drive the microcomputer and an operation voltage of the microcomputer;
the power source control circuit is configured to control charging when the power source control circuit receives a charging permission signal from the microcomputer; and
the microcomputer is configured to output the continuous signal to the constant voltage power source circuit when the microcomputer outputs the charging permission signal to the power source control circuit, and further wherein when the microcomputer stops outputting the charging permission signal to the power source control circuit, the microcomputer is configured to output the intermittent signal to the constant voltage power source circuit and also configured to stop electric power from the constant voltage power source circuit to the power source control circuit.

2. The charger according to claim 1, wherein:
the microcomputer is configured to detect a connection or disconnection of the battery with respect to the charger, and also configured to output the intermittent signal to the constant voltage power source circuit, at least when the disconnection of the battery with respect to the charger is detected.

3. The charger according to claim 1, wherein:
the microcomputer is configured to output the continuous signal to the constant voltage power source circuit even when the charging permission signal is not output, in case that the connection of the battery with respect to the charger is detected and that electric devices provided in the charger operate.

4. The charger according to claim 1, wherein:
the microcomputer is configured to stop outputting the intermittent signal and instead output the continuous signal to the constant voltage power source circuit, when the voltage of the constant voltage power source circuit decreases to a predetermined voltage.

* * * * *